United States Patent
Aoki et al.

(10) Patent No.: US 11,962,820 B2
(45) Date of Patent: Apr. 16, 2024

(54) IMAGE GENERATION APPARATUS, IMAGE GENERATION METHOD, AND PROGRAM INDICATING GAME PLAY STATUS

(71) Applicant: Sony Interactive Entertainment Inc., Tokyo (JP)

(72) Inventors: Sachiyo Aoki, Tokyo (JP); Kenichiro Yokota, Tokyo (JP); Takeshi Nakagawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 533 days.

(21) Appl. No.: 17/267,238

(22) PCT Filed: Aug. 15, 2019

(86) PCT No.: PCT/JP2019/032037
§ 371 (c)(1),
(2) Date: Feb. 9, 2021

(87) PCT Pub. No.: WO2020/036213
PCT Pub. Date: Feb. 20, 2020

(65) Prior Publication Data
US 2021/0235139 A1 Jul. 29, 2021

(30) Foreign Application Priority Data
Aug. 17, 2018 (JP) ................................. 2018-153492

(51) Int. Cl.
*H04N 21/2343* (2011.01)
*A63F 13/31* (2014.01)
(Continued)

(52) U.S. Cl.
CPC ..... *H04N 21/234363* (2013.01); *A63F 13/31* (2014.09); *H04N 21/23406* (2013.01);
(Continued)

(58) Field of Classification Search
CPC ..... G06T 13/20; G06T 15/205; G06T 15/005; G06T 1/20; G06T 15/50; G06T 2215/12;
(Continued)

(56) References Cited

U.S. PATENT DOCUMENTS 7,614,954 B2   11/2009   Okazaki
9,421,467 B2 *  8/2016   Miyamoto ............ A63F 13/822
(Continued)

FOREIGN PATENT DOCUMENTS

CN   1713938 A   12/2005
CN   103002961 A   3/2013
(Continued)

OTHER PUBLICATIONS

Office Action for corresponding CN Application No. 201980053402.9, 12 pages dated Jul. 4, 2022.
(Continued)

*Primary Examiner* — Jin Cheng Wang
(74) *Attorney, Agent, or Firm* — Matthew B. Dernier, Esq.

(57) ABSTRACT

Provided are an image generation apparatus, an image generation method, and a program for generating an image indicative of play status of a game in which two-dimensional objects representative of information to be offered to a viewing audience at the destination of delivery are clearly expressed. An image acquisition section acquires a game image indicative of the content to be displayed on a display device, the game image representing at least the play status of a game in which a virtual three-dimensional object placed in a virtual three-dimensional space is viewed from a point of view in the virtual three-dimensional space. The image acquisition section also acquires a delivery target two-dimensional image indicating a two-dimensional object targeted for delivery, the delivery target two-dimensional
(Continued)

image having the same resolution as that of an image to be delivered. A resizing section resizes the game image to the resolution of the delivery target two-dimensional image so as to generate a resized game image. An image generation section generates an image that combines the resized game image with the delivery target two-dimensional image.

8 Claims, 11 Drawing Sheets

(51) Int. Cl.
  *H04N 21/234* (2011.01)
  *H04N 21/431* (2011.01)
(52) U.S. Cl.
  CPC ...... *H04N 21/4312* (2013.01); *A63F 2300/53* (2013.01); *A63F 2300/66* (2013.01)
(58) Field of Classification Search
  CPC ............... G06T 19/003; G06T 19/20; G06T 2219/2012; H04N 21/234363; H04N 21/23406; H04N 21/4312; H04N 21/4781; H04N 21/632; A63F 13/52; A63F 2300/538; A63F 2300/53; A63F 2300/66; A63F 13/26; A63F 13/53; A63F 13/86
  See application file for complete search history.

(56) References Cited

U.S. PATENT DOCUMENTS

| | | | |
|---|---|---|---|
| 9,986,001 B2 | 5/2018 | Takaichi | |
| 10,315,109 B2 * | 6/2019 | Perry | ...................... H04L 65/70 |
| 10,382,832 B2 * | 8/2019 | Fujii | .................. H04N 21/8153 |
| 10,537,799 B1 * | 1/2020 | Burke | ................... G06T 15/205 |
| 2006/0040738 A1 | 2/2006 | Okazaki | |
| 2013/0109475 A1 | 5/2013 | Hamano | |
| 2015/0281296 A1 | 10/2015 | Takaichi | |
| 2016/0165301 A1 * | 6/2016 | Yu | ...................... H04N 21/4363 725/82 |
| 2016/0182956 A1 * | 6/2016 | Kim | ....................... A63F 13/795 725/38 |
| 2017/0246544 A1 * | 8/2017 | Agarwal | .................. A63F 13/63 |
| 2017/0280199 A1 * | 9/2017 | Davies | ............... H04N 21/8133 |
| 2018/0345146 A1 * | 12/2018 | Okajima | .................. G06F 3/011 |
| 2020/0107075 A1 * | 4/2020 | Davies | ............. H04N 21/23418 |

FOREIGN PATENT DOCUMENTS

| | | |
|---|---|---|
| CN | 103678569 A | 3/2014 |
| CN | 113384879 A | 9/2021 |
| JP | 2014018324 A | 2/2014 |
| JP | 2015097803 A | 5/2015 |
| JP | 5745111 B1 | 7/2015 |
| WO | 2014068806 A1 | 5/2014 |

OTHER PUBLICATIONS

International Preliminary Report on Patentability and Written Opinion for corresponding PCT Application No. PCT/JP2019/032037, 11 pages, dated Mar. 4, 2021.

International Search Report for corresponding PCT Application No. PCT/JP2019/032037, 2 pages, dated Oct. 15, 2019.

* cited by examiner

IMAGE GENERATION APPARATUS, IMAGE GENERATION METHOD, AND PROGRAM INDICATING GAME PLAY STATUS

TECHNICAL FIELD

The present invention relates to an image generation apparatus, an image generation method, and a program.

BACKGROUND ART

Recent years have seen increasing delivery, typically over the Internet, of an image depicting the play status of a game in which virtual three-dimensional objects placed in a virtual three-dimensional space are viewed from a point of view in that virtual three-dimensional space.

SUMMARY

Technical Problems

Generation of the above-mentioned image requires execution high-load processes such as raycasting, for example, at a predetermined frame rate. The resolution of the image is thus limited by the processing capacity of an entertainment apparatus that performs the program of the game. If, for example, a display device viewed by game players is capable of displaying high-resolution images, then it is desired that the resolution of the image to be displayed be as high as possible.

Generally, setting the resolution of the above-mentioned image thus requires taking into consideration the processing capacity of the entertainment apparatus that performs the game program of interest as well as the specs of the display device viewed by the players of the game. That means the resolution of the image may or may not be suitable for delivery. Still, separately generating images for the purpose of delivery requires further resources for image generation and is not realistic.

Thus, for the purpose of delivery, the image destined for the players may preferably be resized before being delivered as the above-mentioned image.

Here, viewership is expected to further increase if, upon delivery of the above-mentioned image, the image is overlaid with two-dimensional objects such as letters, pictorial figures, or symbols representing the information to be offered to a viewing audience at the destination of delivery.

However, resizing the image overlaid with the two-dimensional objects may obscure the two-dimensional objects superposed on the image. For example, decreasing in size an image overlaid with two-dimensional objects may render the two-dimensional objects illegible. On the other hand, enlarging an image on which two-dimensional objects are superposed may blur the two-dimensional objects.

The present invention has been made in view of the above circumstances. One object of the invention is therefore to provide an image generation apparatus, an image generation method, and a program for generating an image indicating the play status of a game in which two-dimensional objects representing information to be offered to a viewing audience at the destination of delivery are clearly expressed.

Solution to Problems

In solving the above problems and according to the present invention, there is provided an image generation apparatus including a game image acquisition section configured to acquire a game image indicative of content to be displayed on a display device, the game image representing at least play status of a game in which a virtual three-dimensional object placed in a virtual three-dimensional space is viewed from a point of view in the virtual three-dimensional space; a delivery target two-dimensional image acquisition section configured to acquire a delivery target two-dimensional image indicating a two-dimensional object targeted for delivery, the delivery target two-dimensional image having the same resolution as that of an image to be delivered; a game image resizing section configured to resize the game image to the resolution of the delivery target two-dimensional image so as to generate a resized game image; and a delivery image generation section configured to generate an image that combines the resized game image with the delivery target two-dimensional image.

The above embodiment of the present invention further includes a three-dimensional space image acquisition section configured to acquire a three-dimensional space image indicating the play status of the game; a display target two-dimensional image acquisition section configured to acquire a display target two-dimensional image indicating a two-dimensional object targeted for display on the display device, the display target two-dimensional image having the same resolution as that of an image to be displayed on the display device; a three-dimensional space image resizing section configured to resize the three-dimensional space image to the resolution of the display target two-dimensional image so as to generate a resized three-dimensional space image; and a game image generation section configured to generate the game image by combining the resized three-dimensional space image with the display target two-dimensional image.

This embodiment may further include a first frame buffer configured to store the three-dimensional space image; a second frame buffer configured to store the display target two-dimensional image; and a third frame buffer configured to store the delivery target two-dimensional image.

Another embodiment of the present invention further includes a display target two-dimensional image acquisition section configured to acquire a display target two-dimensional image indicating a two-dimensional object targeted for display on the display device, the display target two-dimensional image having the same resolution as that of an image to be displayed on the display device. The game image resizing section resizes the game image to the resolution of the delivery target two-dimensional image so as to generate a first resized game image. The game image resizing section resizes the game image to the resolution of the display target two-dimensional image so as to generate a second resized game image. The delivery image generation section generates an image that combines the first resized game image with the delivery target two-dimensional image. A display image generation section that generates an image that combines the second resized game image with the display target two-dimensional image is further included in the embodiment.

The above embodiment may further include a first frame buffer configured to store the game image; a second frame buffer configured to store the display target two-dimensional image; and a third frame buffer configured to store the delivery target two-dimensional image.

In the above embodiments, the two-dimensional object is a letter, a pictorial figure, or a symbol.

Also according to the present invention, there is provided an image generation method including the steps of acquiring a game image indicative of content to be displayed on a display device, the game image representing at least play status of a game in which a virtual three-dimensional object placed in a virtual three-dimensional space is viewed from a point of view in the virtual three-dimensional space; acquiring a delivery target two-dimensional image indicating a two-dimensional object targeted for delivery, the delivery target two-dimensional image having the same resolution as that of an image to be delivered; resizing the game image to the resolution of the delivery target two-dimensional image so as to generate a resized game image; and generating an image that combines the resized game image with the delivery target two-dimensional image.

Also according to the present invention, there is provided a program for causing a computer to perform a procedure including acquiring a game image indicative of content to be displayed on a display device, the game image representing at least play status of a game in which a virtual three-dimensional object placed in a virtual three-dimensional space is viewed from a point of view in the virtual three-dimensional space; acquiring a delivery target two-dimensional image indicating a two-dimensional object targeted for delivery, the delivery target two-dimensional image having the same resolution as that of an image to be delivered; resizing the game image to the resolution of the delivery target two-dimensional image so as to generate a resized game image; and generating an image that combines the resized game image with the delivery target two-dimensional image.

DESCRIPTION OF EMBODIMENT

One preferred embodiment of the present invention is described below with reference to the accompanying drawings.

Figure 1:
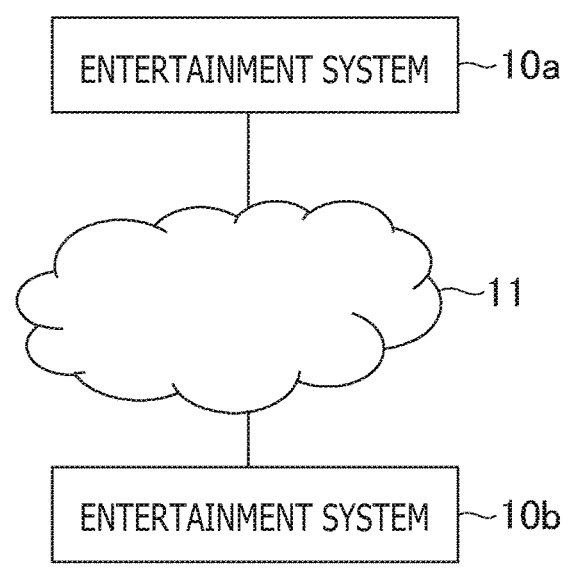
FIG. 1 is a view depicting a typical computer network related to one embodiment of the present invention.
Figure 2:
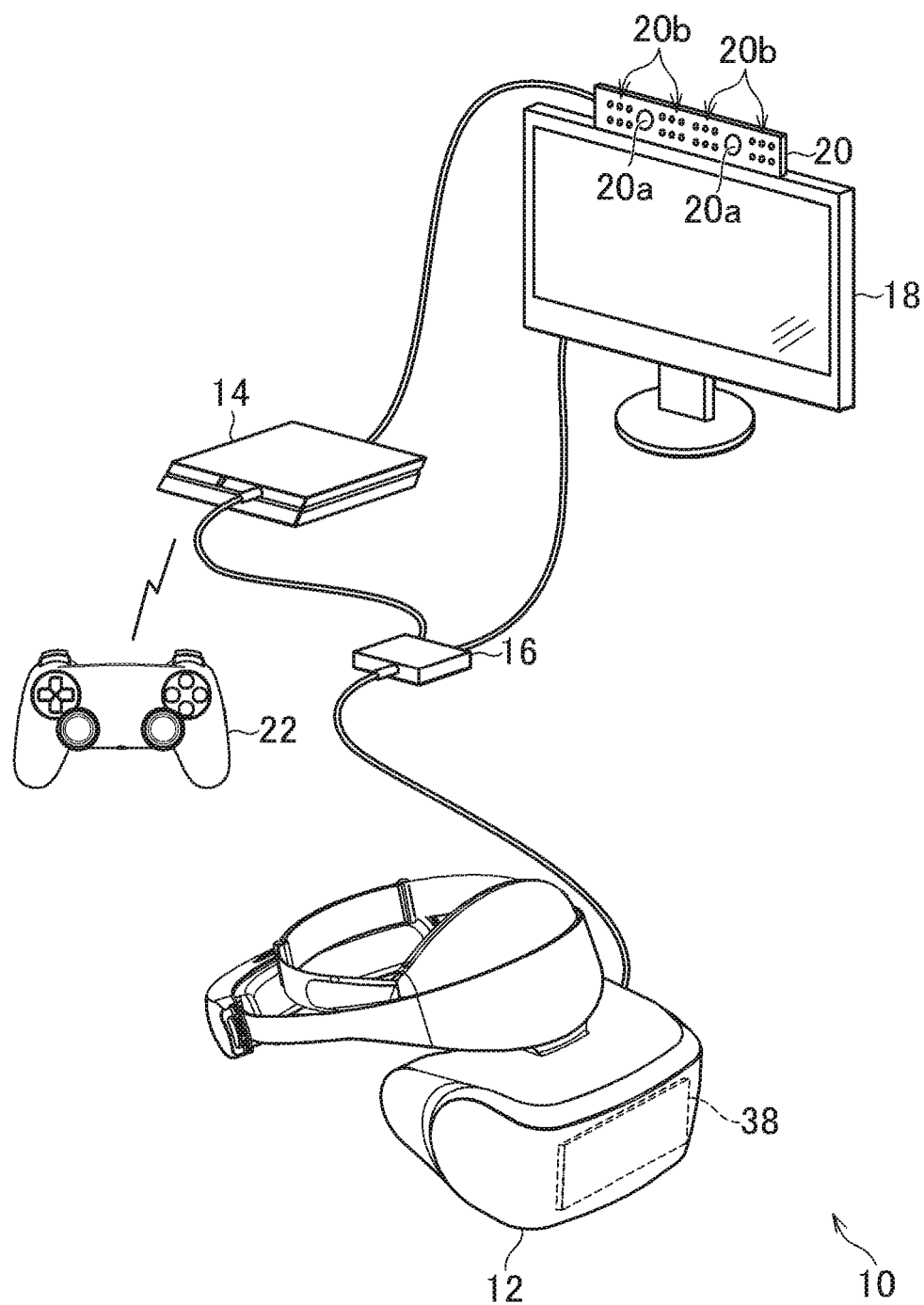
FIG. 2 is a view depicting a typical configuration of entertainment systems related to the embodiment of the present invention.
Figure 3A:
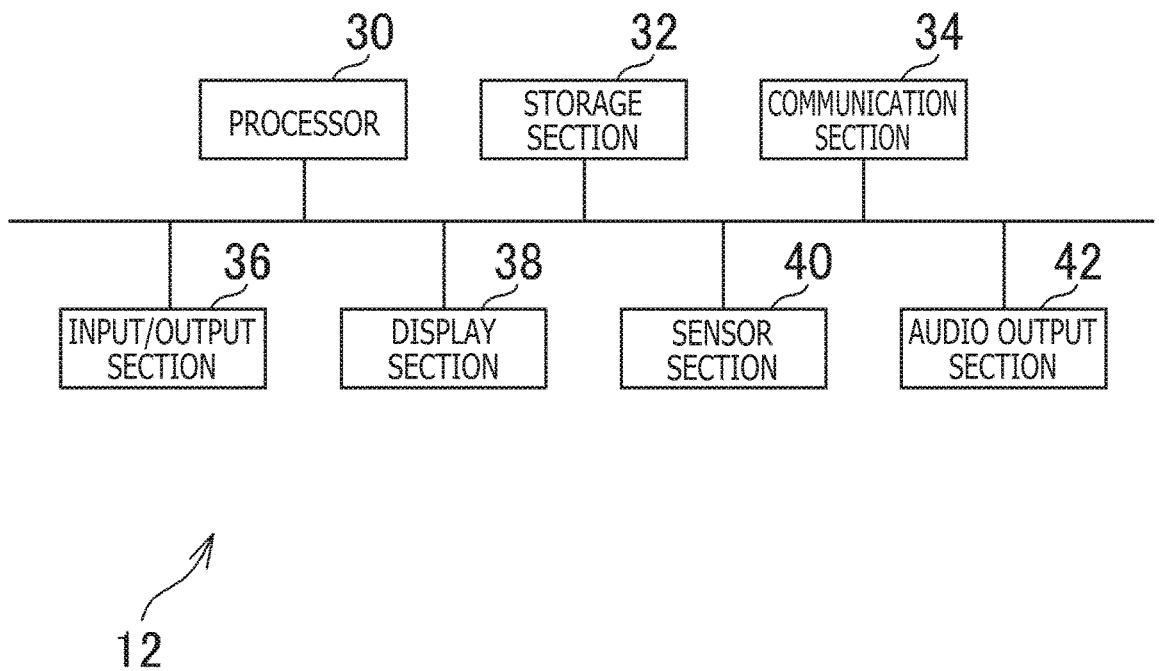
FIG. 3A is a view depicting a typical configuration of an HMD (Head Mounted Display) related to the embodiment of the present invention.
Figure 3B:
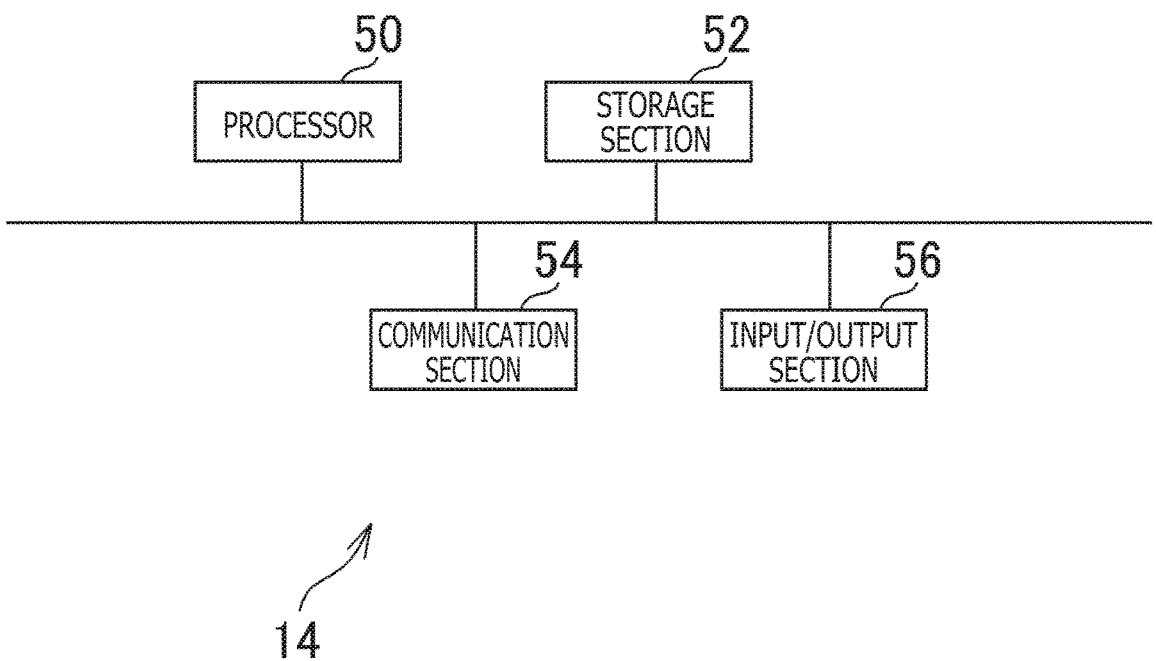
FIG. 3B is a view depicting a typical configuration of an entertainment apparatus related to the embodiment of the present invention.

FIG. 1 is a view depicting an example of a computer network 11 related to one embodiment of the present invention. FIG. 2 is a view depicting a typical configuration of an entertainment system 10 related to the embodiment of the present invention. FIG. 3A is a view depicting a typical configuration of an HMD 12 related to the embodiment of the present invention. FIG. 3B is a view depicting a typical configuration of an entertainment apparatus 14 related to the embodiment of the present invention.

As depicted in FIG. 1, in the present embodiment, multiple entertainment systems 10 (entertainment systems 10a and 10b in the example of FIG. 1) are connected to the computer network 11 such as the Internet. Thus, the entertainment systems 10a and 10b can communicate with each other via the computer network 11.

As depicted in FIG. 2, each entertainment system 10 related to the present embodiment includes the HMD 12, the entertainment apparatus 14, a repeating apparatus 16, a display device 18, a camera/microphone unit 20, and a controller 22.

The HMD 12 related to the present embodiment includes a processor 30, a storage section 32, a communication section 34, an input/output section 36, a display section 38, a sensor section 40, and an audio output section 42, as depicted in FIG. 3A, for example.

The processor 30 is a program-controlled device such as a microprocessor that operates in accordance with programs installed in the HMD 12, for example.

The storage section 32 is a storage element such as a ROM (Read Only Memory) or a RAM (Random Access Memory), for example. The storage section 32 stores the programs, among others, that are executed by the processor 30.

The communication section 34 is a communication interface such as a wireless LAN (Local Area Network) module, for example.

The input/output section 36 is an input/output port such as an HDMI (High-Definition Multimedia Interface; registered trademark) port, a USB (Universal Serial Bus) port, and/or an AUX (Auxiliary) port.

The display section 38 is disposed on the front side of the HMD 12. For example, the display section 38 is a display device such as a liquid crystal display or an organic EL (Electroluminescence) display that displays videos generated by the entertainment apparatus 14. The display section 38 is housed in the enclosure of the HMD 12. Preferably, the display section 38 may, for example, receive a video signal output by the entertainment apparatus 14 and repeated by the repeating apparatus 16, and output the video represented by the received video signal. The display section 38 related to the present embodiment is arranged to display a three-dimensional image by presenting a right-eye image and a left-eye image, for example. Alternatively, the display section 38 may display solely two-dimensional images with no arrangements for presenting three-dimensional images.

The sensor section 40 includes, for example, sensors such as an acceleration sensor and a motion sensor. The sensor section 40 outputs motion data indicative of measurements such as rotation amount and movement amount of the HMD 12 to the processor 30 at a predetermined frame rate.

The audio output section 42, typically constituted by headphones or speakers, outputs sounds represented by audio data generated by the entertainment apparatus 14. The audio output section 42 receives an audio signal output by the entertainment apparatus 14 and repeated by the repeating apparatus 16, for example, and outputs sounds represented by the received audio signal.

The entertainment apparatus 14 related to the present embodiment is, for example, a computer such as a game console, a DVD (Digital Versatile Disc) player, or a Blu-ray (registered trademark) player, for example. The entertainment apparatus 14 related to the present embodiment generates videos and sounds by executing game programs or by reproducing content, the game programs and the content being internally stored or recorded on optical disks, for example. Further, the entertainment apparatus 14 related to the present embodiment outputs a video signal indicative of the video to be generated and an audio signal representing the sound to be generated, to the HMD 12 and to the display device 18 via the repeating apparatus 16.

The entertainment apparatus 14 related to the present embodiment includes a processor 50, a storage section 52, a communication section 54, and an input/output section 56, as depicted in FIG. 3B, for example.

The processor 50 is a program-controlled device such as a CPU (Central Processing Unit) that operates in accordance with programs installed in the entertainment apparatus 14, for example. The processor 50 related to the present embodiment also includes a GPU (Graphics Processing Unit) that renders images in frame buffers based on graphics commands and data supplied from the CPU.

The storage section 52 is a storage element, such as a ROM or a RAM, or a hard disk drive, for example. The storage section 52 stores the programs, among others, that are executed by the processor 50. Further, the storage section 52 related to the present embodiment has areas allocated as frame buffers in which images are rendered by the GPU.

The communication section 54 is a communication interface such as a wireless LAN module, for example.

The input/output section 56 is an input/output port such as an HDMI (registered trademark) port or a USB port.

The repeating apparatus 16 related to the present embodiment is a computer that repeats video and audio signals output from the entertainment apparatus 14 and outputs the repeated video and audio signals to the HMD 12 and to the display device 18.

The display device 18 related to the present embodiment is, for example, a display section such as a liquid crystal display that displays videos represented by the video signal output from the entertainment apparatus 14.

The camera/microphone unit 20 related to the present embodiment includes a camera 20a that captures an image of a subject and outputs the captured image to the entertainment apparatus 14; and a microphone 20b that acquires ambient sounds, converts the acquired sounds into audio data, and outputs the audio data to the entertainment apparatus 14. Further, the camera 20 related to the present embodiment constitutes a stereo camera.

The HMD 12 and the repeating apparatus 16 are capable of exchanging data with each other in a wired or wireless manner, for example. The entertainment apparatus 14 and the repeating apparatus 16 are interconnected by an HDMI cable or by a USB cable, for example, and are capable of exchanging data with each other. The repeating apparatus 16 and the display device 18 are interconnected by an HDMI cable, for example. The entertainment apparatus 14 and the camera/microphone unit 20 are interconnected by an AUX cable, for example.

The controller 22 related to the present embodiment is an operation input apparatus on which operation input is performed for the entertainment apparatus 14. Using the controller 22, the user may carry out diverse kinds of operation input by pressing arrow keys or buttons or by tilting operating sticks on the controller 22. In the present embodiment, the controller 21 outputs the input data corresponding to the operation input to the entertainment apparatus 14. Also, the controller 22 related to the present embodiment includes a USB port. When connected with the entertainment apparatus 14 by a USB cable, the controller 22 can output the input data to the entertainment apparatus 14 in a wired manner. The controller 22 related to the present embodiment further includes a wireless communication module or like arrangement capable of outputting the input data wirelessly to the entertainment apparatus 14.

In the present embodiment, for example, a video representing the play status of a game is generated by a game program executed by the entertainment apparatus 14a included in the entertainment system 10a. This video is displayed on the display device 18a viewed by the player of the game. The video is resized to a resolution suitable for delivery before being overlaid with two-dimensional objects such as letters, pictorial figures, or symbols targeted for delivery. The video overlaid with the two-dimensional objects targeted for delivery is delivered to the entertainment system 10b via the communication section 54a of the entertainment apparatus 14a over the computer network 11. The video is thus displayed on the display device 18b included in the entertainment system 10b. In the description that follows, the video displayed on the display device 18a will be referred to as the player video, and the video displayed on the display device 18b as the viewing audience video.

Figure 4:
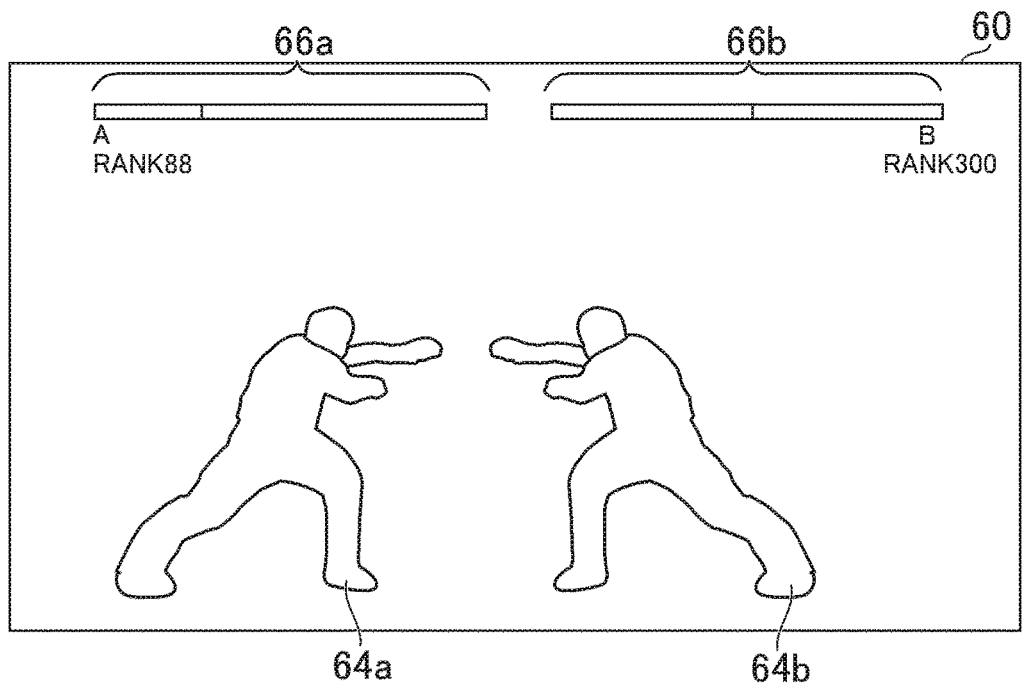
FIG. 4 is a view depicting a typical player image.
Figure 5:
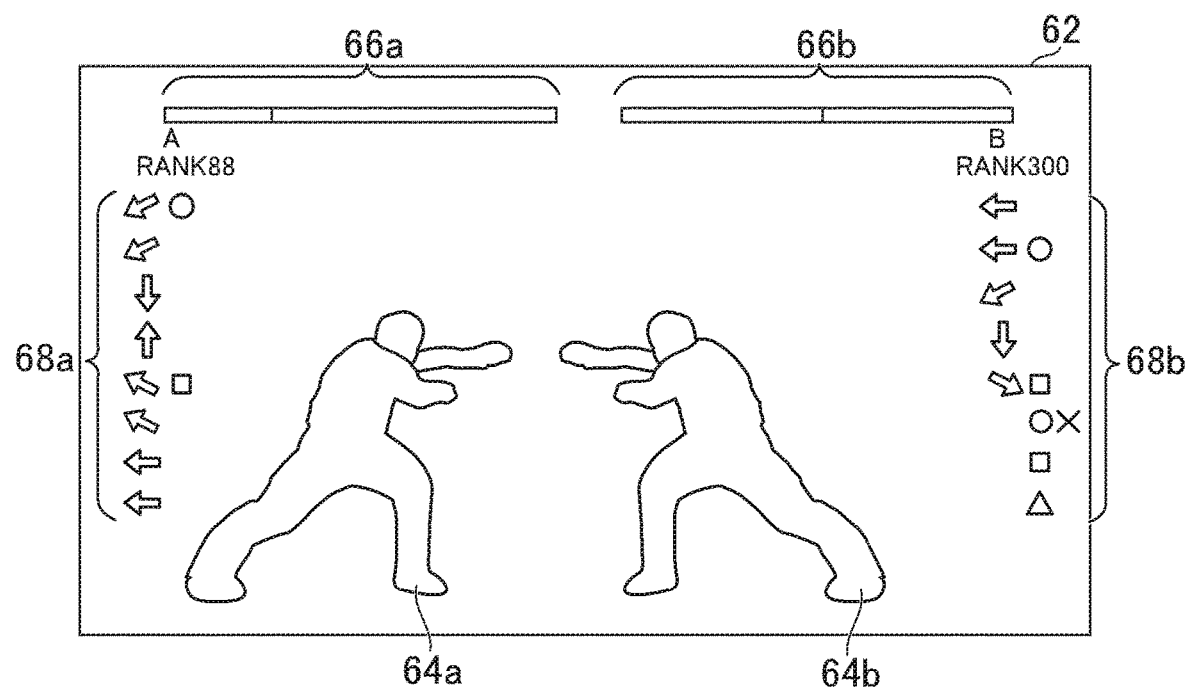
FIG. 5 is a view depicting a typical viewing audience image.

FIG. 4 is a view depicting a typical player image 60, which is a frame image included in the player video. FIG. 5 is a view depicting a typical viewing audience image 62, which is a frame image included in the viewing audience video. In the present embodiment, as described above, the player image 60 depicted in FIG. 4 and the viewing audience image 62 depicted in FIG. 5 have different resolutions.

The player image 60 in FIG. 4 includes character information 64a and character information 64b representing game characters. Also, the player image 60 includes status information 66a and status information 66b indicative of the status of the game characters such as their names, ranks, and lives. For example, the status information 66a represents the status of the game character indicated by the character information 64a. The status information 66b represents the status of the game character indicated by the character information 64b, for example.

On the other hand, the viewing audience image 62 depicted in FIG. 5 includes command history information 68a and command history information 68b, in addition to the character information 64a, the character information 64b, the status information 66a, and the status information 66b. For example, the command history information 68a indicates a history of commands input by the player operating the game character represented by the character information 64a. The command history information 68b indicates a history of commands input by the player operating the game character represented by the character information 64*b*, for example.

With the present embodiment, as described above, some of the content of the player image 60 is in common with the content of the viewing audience image 62, and some of the content of the player image 60 is different from the content of the viewing audience image 62.

How the player image 60 and the viewing audience image 62 are generated is explained below in more detail.

Figure 6:
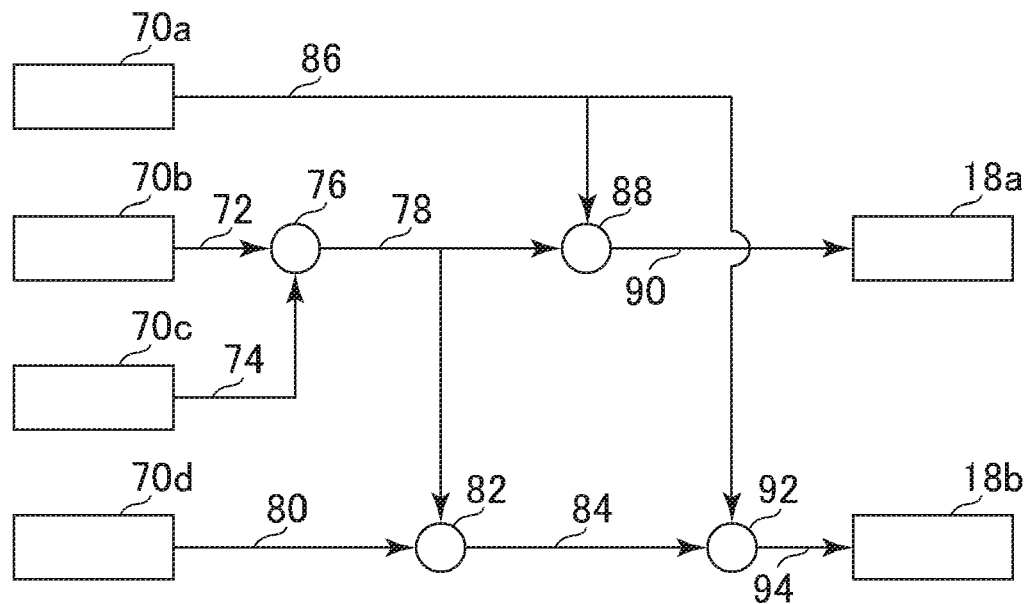
FIG. 6 is an explanatory diagram explaining an example of generating the player image and the viewing audience image.

FIG. 6 is an explanatory diagram explaining an example of generating the player image 60 and the viewing audience image 62 with the present embodiment. As depicted in FIG. 6, four frame buffers 70 (70*a*, 70*b*, 70*c*, and 70*d*) are allocated in the storage section 52*a* of the entertainment apparatus 14*a* in the present embodiment. Preferably, each of the four frame buffers 70 may be implemented with such technology as double buffering or triple buffering, for example.

In the frame buffer 70*a*, a frame image indicative of system-related information is rendered at a predetermined frame rate, the image being generated by execution of a system program such as the operating system different from game programs. Here, a frame image indicating two-dimensional objects such as letters, pictorial figures, or symbols may be rendered in the frame buffer 70*a*.

In the frame buffer 70*b*, a frame image indicating the play status of a game is rendered at a predetermined frame rate, for example. Preferably, a frame image indicative of the play status of the game may be rendered here in the frame buffer 70*b*, for example, the game being one in which virtual three-dimensional objects representing the game characters in a virtual three-dimensional space are viewed from a point of view in that virtual three-dimensional space. In the examples of FIGS. 4 and 5, the frame image indicating the character information 64*a* and the character information 64*b* corresponds to the image rendered in the frame buffer 70*b*.

In the frame buffer 70*c*, a frame image indicative of the information regarding a user interface of the game is rendered at a predetermined frame rate, for example. Preferably, a frame image indicating the information regarding the user interface of the game such as explanations of input operations for the game and status information regarding the game characters may be rendered here in the frame buffer 70*c*, for example. Here, a frame image indicating two-dimensional objects such as letters, pictorial figures, or symbols may be rendered in the frame buffer 70*c*. In the examples of FIGS. 4 and 5, the frame image indicating the status information 66*a* and the status information 66*b* corresponds to the image rendered in the frame buffer 70*c*.

In the frame buffer 70*d*, an image representing the information to be offered to the audience viewing the play status of the game is rendered, for example. This information is not offered to the game players. Here, a frame image indicating two-dimensional objects such as letters, pictorial figures, or symbols may be rendered in the frame buffer 70*d*. In the example of FIG. 5, the frame image indicating the command history information 68*a* and the command history information 68*b* corresponds to the image rendered in the frame buffer 70*d*.

In the example of FIG. 6, as described above, the image generated by execution of the system program is rendered in the frame buffer 70*a*. Further, the images generated by execution of the game program are rendered in the frame buffers 70*b*, 70*c*, and 70*d*.

Here, in the present embodiment, the frame images rendered in the frame buffers 70*a* to 70*d* may have the same resolution or different resolutions. In the ensuing description, it is assumed, for example, that the frame images rendered in the frame buffers 70*a* and 70*c* have approximately the same resolution that is highest, that the frame image rendered in the frame buffer 70*d* has the next-highest resolution, and that the frame image rendered in the frame buffer 70*b* has the lowest resolution.

For example, in order to generate a frame image indicating the play status of the game in which virtual three-dimensional objects placed in a virtual three-dimensional space are viewed from a point of view in that virtual three-dimensional space, it is necessary to perform high-load processes such as raycasting at a predetermined frame rate. The resolution of this frame image is thus limited by the processing capacity of the entertainment apparatus 14 that executes the game program. Because the play status of the game is often expressed by graphics, it is highly probable that a slightly blurred expression of the game play status is acceptable. With this taken into account, it is assumed in the ensuing description that the frame image rendered in the frame buffer 70*b* has the lowest resolution, as described above.

Preferably, the resolution of the frame image rendered in the frame buffer 70*b* may be arranged to vary with the play status of the game. For example, upon generation of an image subject to a high rendering load, the resolution of that image may be lowered.

Low resolutions may render blurry the two-dimensional objects such as letters, pictorial figures, or symbols placed in the frame image. The user may then have difficulty in understanding the content of that image. With this taken into consideration, the resolution of the frame image rendered in the frame buffer 70*c* or 70*d* is set higher than the resolution of the frame image rendered in the frame buffer 70*b*.

Also, in the ensuing description, it is assumed that the resolution of the delivered video is set lower than the resolution of the video displayed on the display device 18*a*. Thus, the resolution of the frame image rendered in the frame buffer 70*d* is set lower than the resolution of the frame image rendered in the frame buffer 70*c*, as described above.

In the example of FIG. 6, an image 78 is generated by a compositor 76 combining an image 72 stored in the frame buffer 70*b* with an image 74 stored in the frame buffer 70*c*. Here, the compositor 76 resizes the image 72 to the resolution of the image 74, for example. The image 72 is enlarged in this case. The compositor 76 thus generates the image 78 that combines the image 74 with the resized image 72. The image 78 indicates the content of both the image 72 and the image 74.

In another example, an image 84 is generated by a compositor 82 combining the image 78 with an image 80 stored in the frame buffer 70*d*. Here, the compositor 82 resizes the image 78 to the resolution of the image 80, for example. The image 78 is reduced in size in this case. The compositor 82 thus generates the image 84 that combines the image 80 with the resized image 78. The image 84 indicates the content of both the image 78 and the image 80.

In another example, an image 90 is generated by a compositor 88 combining the image 78 with an image 86 stored in the frame buffer 70*a*. Here, the compositor 88 generates the image 90 that combines the image 78 with the image 86, for example. The image 90 indicates the content of both the image 78 and the image 86. In this case, for example, it is assumed that the resolution of the image 90 is the same as that of the image 74 rendered in the frame buffer 70*c*.

In another example, an image 94 is generated by a compositor 92 combining the image 84 with the image 86 stored in the frame buffer 70a. Here, the compositor 92 resizes the image 86 to the resolution of the image 84, for example. In this case, the image 86 is reduced in size. The compositor 92 thus generates the image 94 that combines the image 84 with the resized image 86. The image 94 indicates the content of both the image 84 and the image 86. It is assumed here that the resolution of the image 94 is the same as that of the image 80 rendered in the frame buffer 70d.

The image 90 is then displayed as the player image 60 on the display device 18a. The image 94 is transmitted as the viewing audience image 62 to the entertainment system 10b via the communication section 54a, the image 94 being displayed on the display device 18b viewed by the audience at the destination.

Resizing an image overlaid with two-dimensional objects can make the two-dimensional objects unclear in the image. For example, reducing the image on which two-dimensional objects are superposed can smudge the two-dimensional objects in the image. Further, enlarging the image overlaid with two-dimensional objects can blur the two-dimensional objects in the image. In the example of FIG. 6, the content of the image 80 rendered in the frame buffer 70d is neither enlarged nor reduced when placed in the image 94 as described above. Thus, in the example of FIG. 6, it is possible to generate the image indicative of the play status of a game, the image expressing clearly two-dimensional objects representing the information to be offered to a viewing audience at the destination of delivery.

In another example, the command history information 68a and the command history information 68b presumably serve as quite a useful reference for the audience planning to play the game later. Thus, the display of such command histories appearing in the video viewed by the audience is useful for the viewing audience. On the other hand, the command histories are not very meaningful for the players who actually input the commands. The players could in fact be annoyed by the command histories indicated in the player video viewed by the players.

In the example of FIG. 6, as described above, the command history information 68a and the command history information 68b may be controlled to be displayed in the viewing audience image 62 but not to appear in the player image 60. Thus, in the example FIG. 6, the players can play the game without being distracted by the command history information 68a or 68b while the viewing audience is being offered the command history information 68a and the command history information 68b.

Figure 7:
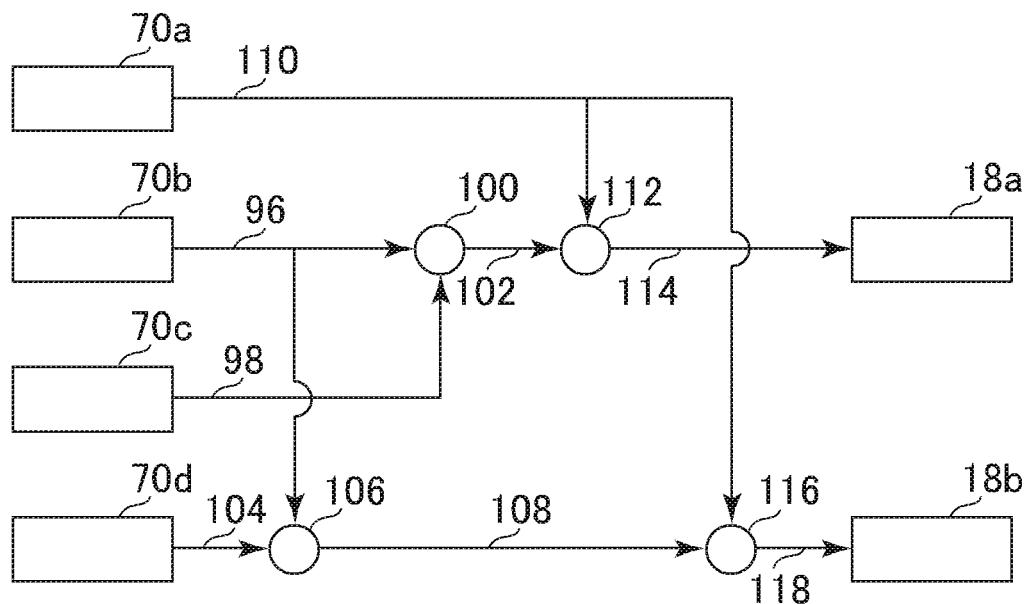
FIG. 7 is an explanatory diagram explaining another example of generating the player image and the viewing audience image.

FIG. 7 is an explanatory diagram explaining another example of generating the player image 60 and the viewing audience image 62 with the present embodiment.

In the example of FIG. 7, the frame images rendered in the frame buffers 70a to 70d are similar to the frame images rendered in the frame buffers 70a to 70d in the example of FIG. 6 and thus will not be discussed further.

In the example of FIG. 7, for example, an image 102 is generated by a compositor 100 combining an image 96 stored in the frame buffer 70b with an image 98 stored in the frame buffer 70c. Here, the compositor 100 resizes the image 96 to the resolution of the image 98, for example. The image 96 is enlarged in this case. The compositor 100 thus generates the image 102 that combines the image 98 with the resized image 96. The image 102 indicates the content of both the image 96 and the image 98.

In another example, an image 108 is generated by a compositor 106 combining the image 96 stored in the frame buffer 70b with an image 104 stored in the frame buffer 70d. Here, the compositor 106 resizes the image 96 to the resolution of the image 104, for example. The image 96 is enlarged in this case. The compositor 106 thus generates the image 108 that combines the 104 with the resized image 96. The image 108 indicates the content of both the image 96 and the image 104.

In another example, an image 114 is generated by a compositor 112 combining the image 102 with an image 110 stored in the frame buffer 70a. Here, the compositor 112 generates the image 114 that combines the image 102 with the image 110, for example. The image 114 indicates the content of both the image 102 and the image 110. It is assumed here that the image 114 has the same resolution as that of the image 98 rendered in the frame buffer 70c, for example.

Also, an image 118 is generated by a compositor 116 combining the image 108 with the image 110 stored in the frame buffer 70a. Here, the compositor 116 resizes the image 110 to the resolution of the image 108, for example. In this case, the image 110 is reduced in size. The compositor 116 thus generates the image 118 that combines the image 108 with the resized image 110. The image 118 indicates the content of both the image 108 and the image 110. It is assumed here that the image 118 has the same resolution as that of the image 104 rendered in the frame buffer 70d, for example.

The image 114 is then displayed as the player image 60 on the display device 18a. The image 118 is transmitted as the viewing audience image 62 to the entertainment system 10b via the communication section 54a, the transmitted image being displayed on the display device 18b viewed by the audience at the destination.

In the example of FIG. 7, as described above, the content of the image 104 rendered in the frame buffer 70d is neither enlarged nor reduced when placed in the image 118. Thus, what is generated in the example of FIG. 7 is the image representing the play status of the game in a manner clearly indicating the two-dimensional objects denoting the information to be offered to the audience at the destination of delivery.

Also, in the example of FIG. 7, the content of the frame image stored in the frame buffer 70b appears in the player image 60 but not in the viewing audience image 62. Further, the content of the frame image stored in the frame buffer 70d appears in the viewing audience image 62 but not in the player image 60.

For example, it is not desirable to reveal to the viewing audience the information related to the players' privacy such as their names. It is thus preferred that the information regarding the players' privacy be prevented from appearing in the viewing audience video to be viewed by an audience.

In the example of FIG. 7, as discussed above, the information related to privacy, for example, is controlled to appear in the player image 60 but not in the viewing audience image 62. Thus, the information not to be revealed to the viewing audience is controlled to be prevented from being viewed by the audience in the example of FIG. 7.

Also, in the example of FIG. 7, as in the example of FIG. 6, the command history information 68a and the command history information 68b may be controlled to appear in the viewing audience image 62 but not in the player image 60. Thus, in the example of FIG. 7, the players can also play the game without being distracted by the command history information 68a or 68b while the viewing audience is being offered the command history information 68a and the command history information 68b.

Figure 8:
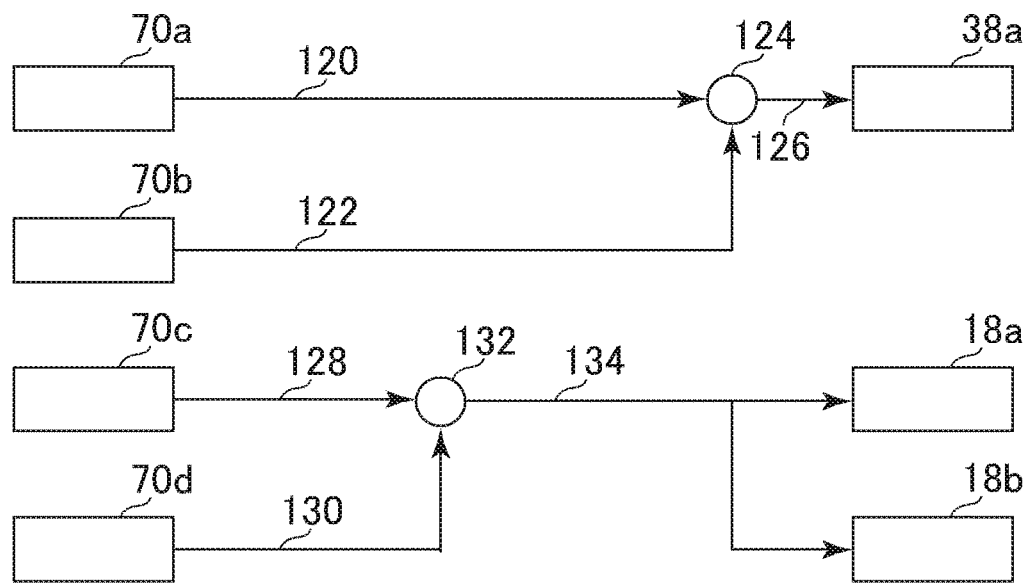
FIG. 8 is an explanatory diagram explaining an example of generating the player image, the viewing audience image, and an HMD image.

FIG. 8 is an explanatory diagram explaining an example of generating the player image 60, the viewing audience image 62, and an HMD image with the present embodiment. In the example of FIG. 8, an HMD image is generated, besides the player image 60 and viewing audience image 62, as a frame image included in the video to be displayed on a display section 38a of an HMD 12a as part of the entertainment system 10a.

In the example of FIG. 8, the frame image indicating the play status of the game is rendered in the frame buffer 70a at a predetermined frame rate. Here, for example, it is possible to render, at a predetermined frame rate, a frame image as a three-dimensional image indicating the play status of a game in which virtual three-dimensional objects representing the game characters placed in a virtual three-dimensional space are viewed from a point of view in that virtual three-dimensional space.

In the frame buffer 70b, a frame image indicative of system-related information is rendered at a predetermined frame rate, the frame image being generated by execution of a system program such as the operating system different from game programs. Here, a frame image indicating two-dimensional objects such as letters, pictorial figures, or symbols may be rendered in the frame buffer 70b.

In the frame buffer 70c, a frame image is rendered at a predetermined frame rate, the image being different from the frame image rendered in the frame buffer 70a and indicating the play status of the game, for example. Here, for example, it is possible to render in the frame buffer 70c a two-dimensional image corresponding to the above-mentioned three-dimensional image and indicating the play status of the game in which virtual three-dimensional objects representing the game characters placed in a virtual three-dimensional space are viewed from a point of view in that virtual three-dimensional space. In another example, the frame buffer 70c may have an image that indicates what the virtual three-dimensional space looks like when viewed from a point of view different from that of the frame image rendered in the frame buffer 70a rendered.

In the frame buffer 70d, a frame image indicating system-related information is rendered at a predetermined frame rate, the frame image being different from the frame image rendered in the frame buffer 70b, the frame image being further generated by execution of the system program, for example. Here, an image indicative of the information not to be viewed by anybody but the person wearing the HMD 12a may be rendered in the frame buffer 70b, and an image indicative of the information allowed to be viewed by those other than the person wearing the HMD 12a may be rendered in the frame buffer 70d, for example. Also, an image indicative of the information not to be viewed by the person wearing the HMD 12a may be rendered in the frame buffer 70d. Here, a frame image indicating two-dimensional objects such as letters, pictorial figures, or symbols may be rendered in the frame buffer 70d.

In the example of FIG. 8, as described above, the images generated by execution of the system program are rendered in the frame buffers 70b and 70d. The images generated by execution of the game program are rendered in the frame buffers 70a and 70c.

In the ensuing description, it is assumed, for example, that the frame images rendered in the frame buffers 70b and 70d have approximately the same resolution that is highest, that the frame image rendered in the frame buffer 70c has the next-highest resolution, and that the frame image rendered in the frame buffer 70a has the lowest resolution.

In the example of FIG. 8, an image 126 is generated by a compositor 124 combining an image 120 stored in the frame buffer 70a with an image 122 stored in the frame buffer 70b, for example. Here, the compositor 124 resizes the image 120 to the resolution of the image 122, for example. The image 120 is enlarged in this case. The compositor 124 thus generates the image 126 that combines the image 122 with the resized image 120. The image 126 indicates the content of both the image 120 and the image 122.

In another example, an image 134 is generated by a compositor 132 combining an image 128 stored in the frame buffer 70c with an image 130 stored in the frame buffer 70d. Here, the compositor 132 resizes the image 128 to the resolution of the image 130, for example. In this case, the image 128 is enlarged. The compositor 132 thus generates the image 134 that combines the image 130 with the resized image 128. The image 134 indicates the content of both the image 128 and the image 130.

The image 126 is then displayed as the HMD image on the display section 38a of the HMD 12a. The image 134 is displayed as the player image 60 on the display device 18a and transmitted as the viewing audience image 62 to the entertainment system 10b via the communication section 54a, the transmitted image being displayed on the display device 18b viewed by the audience at the destination. Preferably, the image 134 may be resized in a manner suitable for delivery before being transmitted to the entertainment system 10b.

Figure 9:
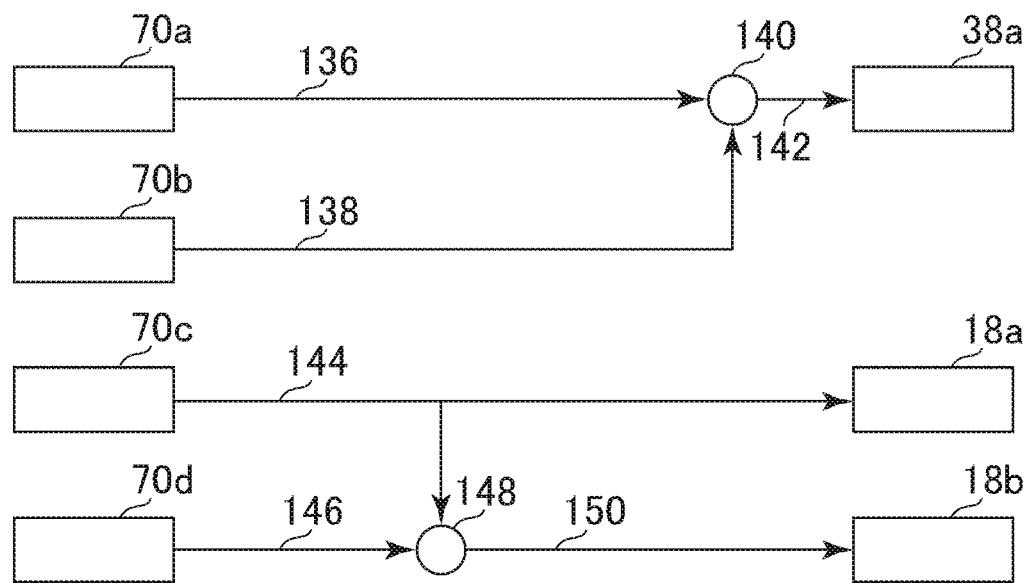
FIG. 9 is an explanatory diagram explaining another example of generating the player image, the viewing audience image, and the HMD image.

FIG. 9 is an explanatory diagram explaining another example of generating the player image 60, the viewing audience image 62, and the HMD image with the present embodiment.

In the example of FIG. 9, the frame images rendered in the frame buffers 70a to 70c are similar to the frame images rendered in the frame buffers 70a to 70c in the example of FIG. 8 and thus will not be discussed further.

In the example of FIG. 9, a frame image indicating system-related information is rendered in the frame buffer 70d at a predetermined frame rate, the image being generated by execution of the system program and being different from the frame image rendered in the frame buffer 70b, for example. Here, an image indicative of the information to be offered to the audience viewing the play status of the game may be rendered in the frame buffer 70d, for example. Alternatively, an image indicative of the information not to be viewed by the person viewing the display device 18a or wearing the HMD 12a may be rendered in the frame buffer 70d. Here, a frame image indicating two-dimensional objects such as letters, pictorial figures, or symbols may be rendered in the frame buffer 70d.

In the example of FIG. 9, an image 142 is generated by a compositor 140 combining an image 136 stored in the frame buffer 70a with an image 138 stored in the frame buffer 70b. Here, the compositor 140 resizes the image 136 to the resolution of the image 138, for example. In this case, the image 136 is enlarged. The compositor 140 thus generates the image 142 that combines the image 138 with the resized image 136. The image 142 indicates the content of both the image 136 and the image 138.

In another example, an image 150 is generated by a compositor 148 combining an image 144 stored in the frame buffer 70c with an image 146 stored in the frame buffer 70d. Here, the compositor 148 resizes the image 144 to the resolution of the image 146, for example. In this case, the image 144 is enlarged. The compositor 148 thus generates the image 150 that combines the image 146 with the resized image 144. The image 150 indicates the content of both the image 144 and the image 146. It is assumed here, for example, that the image 150 has the same resolution as that of the image 146 rendered in the frame buffer 70d.

The image 142 is then displayed as the HMD image on the display section 38a of the HMD 12a. The image 144 is displayed as the player image 60 on the display device 18a. The image 150 is transmitted as the viewing audience image 62 to the entertainment system 10b via the communication section 54a, the transmitted image being displayed on the display device 18b viewed by the audience at the destination.

In the example of FIG. 9, it is thus possible to generate an image indicative of the play status of the game, the image clearly depicting the two-dimensional objects representing the information to be offered to the audience at the destination of delivery.

It should be noted that, in the present embodiment, the viewing audience image 62 may preferably be encoded before being transmitted to the entertainment system 10b.

Explained further below are the functions of the entertainment apparatus 14a included in the entertainment system 10a related to the present embodiment as well as the processes performed by the entertainment apparatus 14a, the explanations centering on the generation of images to be delivered to the entertainment system 10b.

Figure 10:
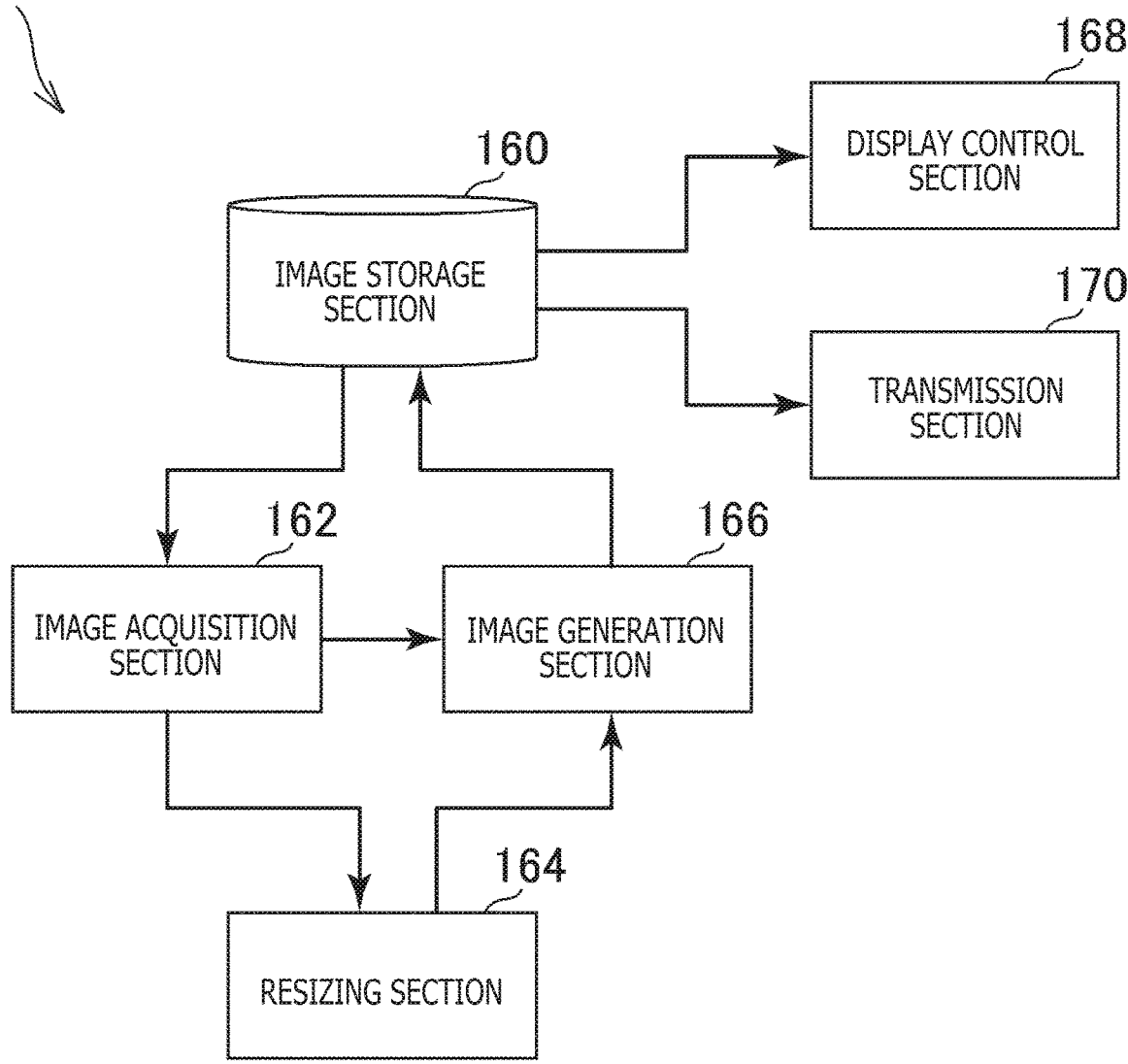
FIG. 10 is a functional block diagram depicting typical functions of the entertainment apparatus related to the embodiment of the present invention.

FIG. 10 is a functional block diagram depicting typical functions of the entertainment apparatus 14a related to the present embodiment. It is to be noted that not all functions denoted in FIG. 10 need to be implemented and that a function or functions other than those in FIG. 10 may be implemented in the entertainment apparatus 14a related to the present embodiment.

As depicted in FIG. 10, the entertainment apparatus 14a includes, functionally, for example, an image storage section 160, an image acquisition section 162, a resizing section 164, an image generation section 166, a display control section 168, and a transmission section 170. The image storage section 160 is implemented using mainly the storage section 52. The image acquisition section 162, the resizing section 164, and the image generation section 166 are implemented using mainly the processor 50. The display control section 168 is implemented using mainly the processor 50 and the input/output section 56. The transmission section 170 is implemented using mainly the processor 50 and the communication section 54. The entertainment apparatus 14a assumes the role of an image generation apparatus that generates images to be delivered with the present embodiment.

The above-mentioned functions may be implemented by the processor 50 executing programs installed in the entertainment apparatus 14 serving as a computer, the programs including commands corresponding to these functions. The programs may be stored on computer-readable information storage media such as optical disks, magnetic disks, magnetic tapes, magneto-optical disks, or flash memories, or transmitted typically via the Internet when supplied to the entertainment apparatus 14.

In the present embodiment, for example, the image storage section 160 stores images. The multiple images stored individually in the frame buffers 70a to 70d in the above-described examples correspond to the images stored in the image storage section 160. Here, for example, new frame images are stored individually at a predetermined frame rate into the frame buffers 70a to 70d included in the image storage section 160.

Also, in the present embodiment, for example, the image storage section 160 stores the images generated by the image generation section 166.

In the present embodiment, for example, the image acquisition section 162 acquires the images stored in the image storage section 160. Here, for example, the image acquisition section 162 acquires the images stored in the frame buffers 70a to 70d or the images generated by the image generation section 166.

Here, for example, the image acquisition section 162 may acquire a game image indicative of the content to be displayed on the display device 18a, the acquired game image representing at least the play status of the game in which virtual three-dimensional objects placed in a virtual three-dimensional space are viewed from a point of view in that virtual three-dimensional space. For example, the image 78 in the example of FIG. 6, the image 96 stored in the frame buffer 70b in the example of FIG. 7, and the image 144 stored in the frame buffer 70c in the example of FIG. 9 correspond to this game image.

In another example, the image acquisition section 162 may acquire a delivery target two-dimensional image having the same resolution as that of images to be delivered, the two-dimensional image indicating two-dimensional objects targeted for delivery. For example, the image 80 stored in the frame buffer 70d in the example of FIG. 6, the image 104 stored in the frame buffer 70d in the example of FIG. 7, and the image 146 stored in the frame buffer 70d in the example of FIG. 9 correspond to this delivery target two-dimensional image.

In another example, the image acquisition section 162 may acquire a three-dimensional space image indicative of the play status of the game. For example, the image 72 stored in the frame buffer 70b in the example of FIG. 6 corresponds to this three-dimensional space image.

In another example, the image acquisition section 162 may acquire a display target two-dimensional image having the same resolution as that of images to be displayed on the display device 18a, the display target two-dimensional image indicating two-dimensional objects targeted for display on the display device 18a. For example, the image 74 stored in the frame buffer 70c in the example of FIG. 6 and the image 98 stored in the frame buffer 70c in the example of FIG. 7 correspond to this display target two-dimensional image.

In the present embodiment, for example, the resizing section 164 generates a resized game image by resizing the game image to the resolution of the delivery target two-dimensional image. For example, the function of the compositor 82 in the example of FIG. 6, the function of the compositor 106 in the example of FIG. 7, and the function of the compositor 148 in the example of FIG. 9 correspond to this function of the resizing section 164.

The resizing section 164 may also generate a resized three-dimensional space image by resizing the three-dimensional space image to the resolution of the display target two-dimensional image. For example, the function of the compositor 76 in the example of FIG. 6 corresponds to this function of the resizing section 164.

The resizing section 164 may also generate a first resized game image by resizing the game image to the resolution of the delivery target two-dimensional image. Further, the resizing section 164 may generate a second resized game image by resizing the game image to the resolution of the display target two-dimensional image. For example, the function of the compositor 100 and that of the compositor 106 in the example of FIG. 7 correspond to this function of the resizing section 164. In this case, the compositor 106 generates the first resized game image, and the compositor 100 generates the second resized game image.

In the present embodiment, for example, the image generation section 166 generates a composite image by combining multiple images stored in the image storage section 160. The image generation section 166 stores the generated composite image into the image storage section 160 in the present embodiment, for example.

Here, the image generation section 166 may generate an image that combines the resized game image with the delivery target two-dimensional image. For example, the image 84 in the example of FIG. 6, the image 108 in the example of FIG. 7, and the image 150 in the example of FIG. 9 correspond to this composite image.

The image generation section 166 may also generate the game image by combining the resized three-dimensional space image with the display target two-dimensional image. For example, the image 78 in the example of FIG. 6 corresponds to the game image generated in this manner.

The image generation section 166 may further combine the first resized game image with the delivery target two-dimensional image to generate an image indicative of the content to be delivered. For example, the image 108 in the example of FIG. 7 corresponds to this image. Further, the image generation section 166 may generate an image that combines the second resized image with the display target two-dimensional image. For example, the image 102 in the example of FIG. 7 corresponds to this image.

In the present embodiment, for example, the display control section 168 causes the display device 18a to display the image generated by the image generation section 166.

In the present embodiment, for example, the transmission section 170 transmits the image generated by the image generation section 166 to the entertainment system 10b.

Figure 11:
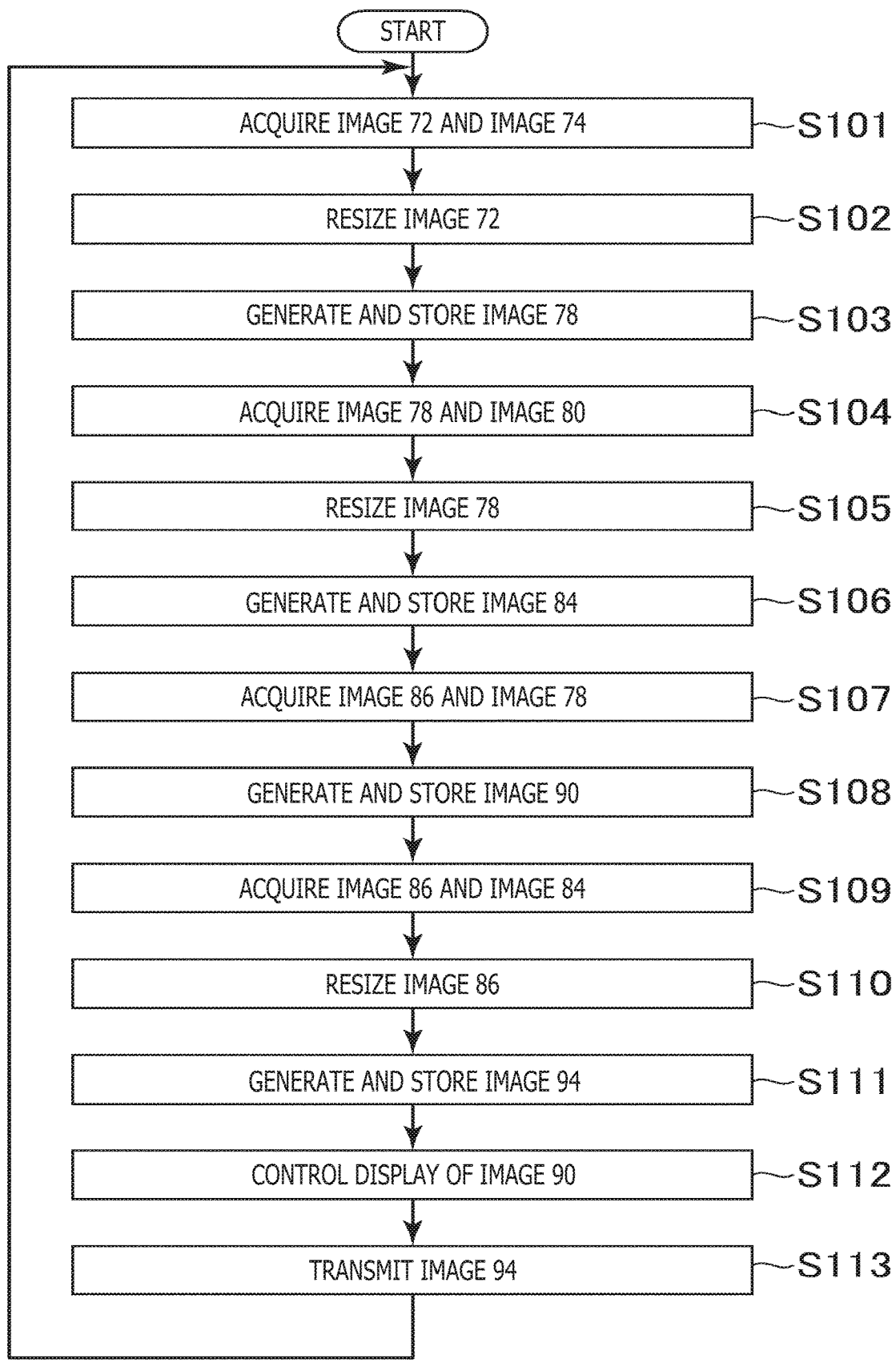
FIG. 11 is a flowchart depicting a typical flow of a process performed by the entertainment apparatus related to the embodiment of the present invention.

Explained hereunder with reference to the flowchart of FIG. 11 is a typical flow of a process performed repeatedly at a predetermined frame rate by the entertainment apparatus 14a related to the present embodiment. The processing in this process example corresponds to the details explained earlier with reference to FIG. 6.

First, the image acquisition section 162 acquires the image 72 stored as a frame image in the frame buffer 70b and the image 74 stored as a frame image in the frame buffer 70c (S101).

Then, the resizing section 164 resizes the image 72 to the resolution of the image 74 (S102).

Then, the image generation section 166 generates the image 78 that combines the image 74 with the resized image 72, and stores the image 78 into the image storage section 160 (S103).

Then, the image acquisition section 162 acquires the image 78 stored in the image storage section 160 and the image 80 stored as a frame image in the frame buffer 70d (S104).

Then, the resizing section 164 resizes the image 78 to the resolution of the image 80 (S105).

Then, the image generation section 166 generates the image 84 that combines the image 80 with the resized image 78, and stores the image 84 into the image storage section 160 (S106).

Then, the image acquisition section 162 acquires the image 86 stored as a frame image in the frame buffer 70a and the image 78 stored in the image storage section 160 (S107).

Then, the image generation section 166 generates the image 90 that combines the image 78 with the image 86, and stores the image 90 into the image storage section 160 (S108).

Then, the image acquisition section 162 acquires the image 86 stored as a frame image in the frame buffer 70a and the image 84 stored in the image storage section 160 (S109).

Then, the resizing section 164 resizes the image 86 to the resolution of the image 84 (S110).

Then, the image generation section 166 generates the image 94 that combines the image 84 with the resized image 86, and stores the image 94 into the image storage section 160 (S111).

Then, the display control section 168 performs control to display on the display device 18a the image 90 stored in the image storage section 160 (S112).

Then, the transmission section 170 transmits the image 94 stored in the image storage section 160 to the entertainment system 10b (S113). Here, for example, the transmission section 170 may encode the image 94 before transmitting it to the entertainment system 10b.

Control is then returned to the processing in S101. In this process example, the processing ranging from S101 to S113 is thus performed repeatedly at a predetermined frame rate.

Figure 12:
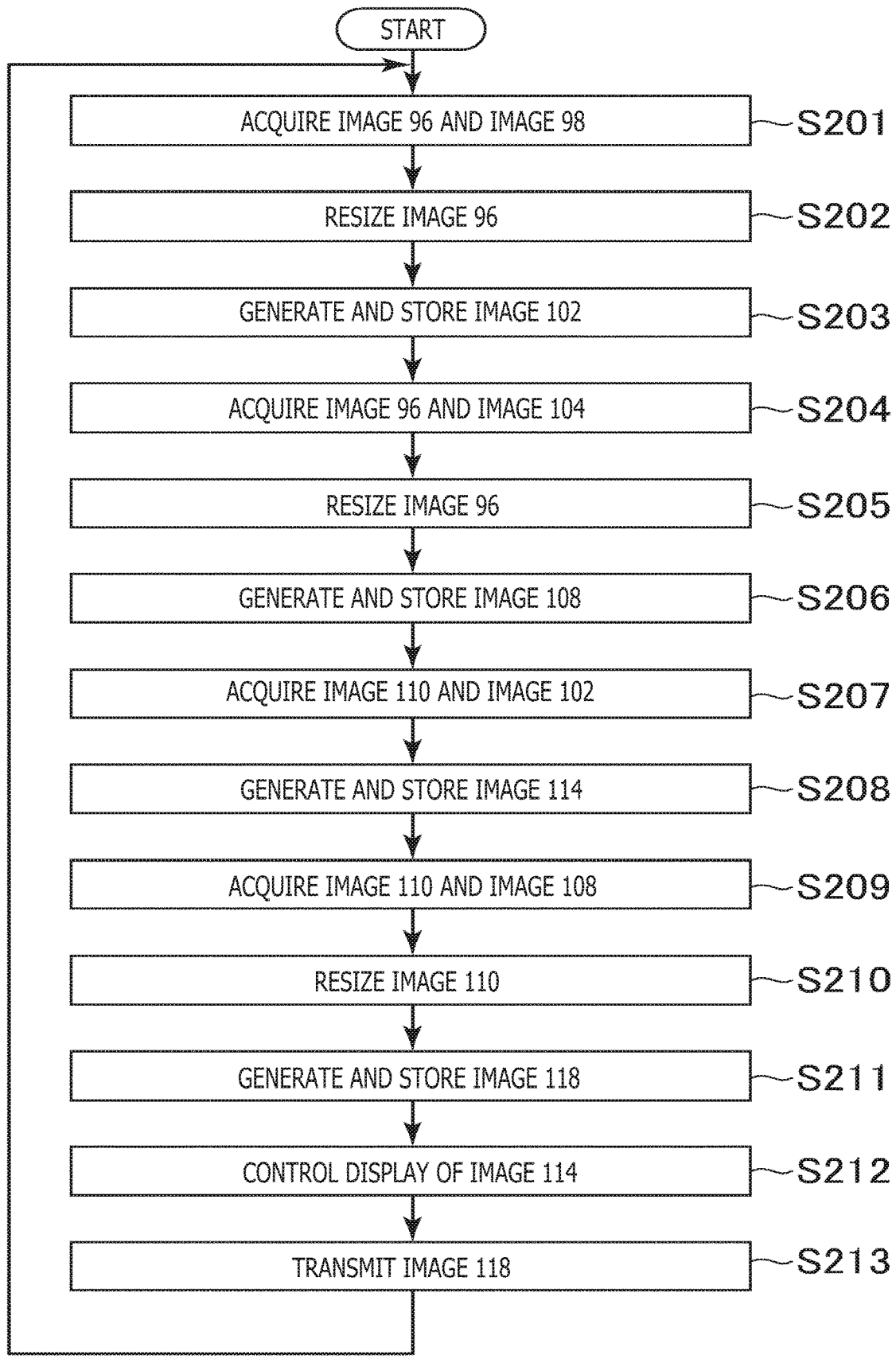
FIG. 12 is a flowchart depicting a typical flow of another process performed by the entertainment apparatus related to the embodiment of the present invention.

Explained next with reference to the flowchart of FIG. 12 is a typical flow of another process performed repeatedly at a predetermined frame rate by the entertainment apparatus 14 related to the present embodiment. The processing in this process example corresponds to the details explained earlier with reference to FIG. 7.

First, the image acquisition section 162 acquires the image 96 stored as a frame image in the frame buffer 70b and the image 98 stored as a frame image in the frame buffer 70c (S201).

The resizing section 164 then resizes the image 96 to the resolution of the image 98 (S202).

Then, the image generation section 166 generates the image 102 that combines the image 98 with the resized image 96, and stores the image 102 into the image storage section 160 (S203).

Then, the image acquisition section 162 acquires the image 96 stored as a frame image in the frame buffer 70b and the image 104 stored as a frame image in the frame buffer 70d (S204).

Then, the resizing section 164 resizes the image 96 to the resolution of the image 104 (S205).

Then, the image generation section 166 generates the image 108 that combines the image 104 with the resized image 96, and stores the image 108 into the image storage section 160 (S206).

Then, the image acquisition section 162 acquires the image 110 stored as a frame image in the frame buffer 70a and the image 102 stored in the image storage section 160 (S207).

Then, the image generation section 166 generates the image 114 that combines the image 102 with the image 110, and stores the image 114 into the image storage section 160 (S208).

Then, the image acquisition section 162 acquires the image 110 stored as a frame image in the frame buffer 70a and the image 108 stored in the image storage section 160 (S209).

Then, the resizing section 164 resizes the image 110 to the resolution of the image 108 (S210).

Then, the image generation section 166 generates the image 118 that combines the image 108 with the resized image 110, and stores the image 118 into the image storage section 160 (S211).

Then, the display control section 168 performs control to display on the display device 18a the image 114 stored in the image storage section 160 (S212).

Then, the transmission section 170 transmits the image 118 stored in the image storage section 160 to the entertainment system 10b (S213). Here, for example, the transmission section 170 may encode the image 118 before transmitting it to the entertainment system 10b.

Control is then returned to the processing in S201. In this process example, the processing ranging from S201 to S213 is thus performed repeatedly at a predetermined frame rate.

Figure 13:
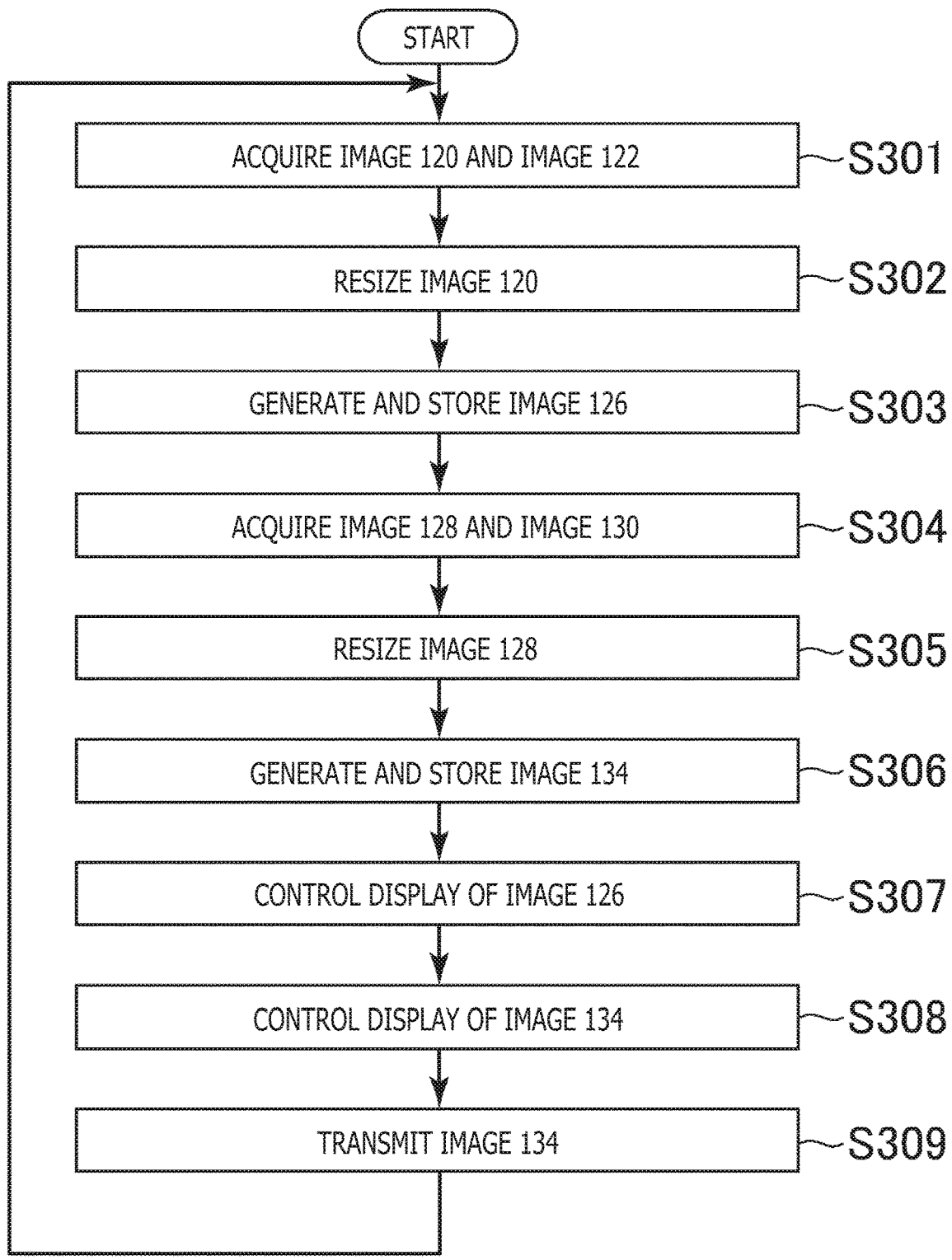
FIG. 13 is a flowchart depicting a typical flow of another process performed by the entertainment apparatus related to the embodiment of the present invention.

Explained next with reference to the flowchart of FIG. 13 is a typical flow of another process performed repeatedly at a predetermined frame rate by the entertainment apparatus 14 related to the present embodiment. The processing in this process example corresponds to the details explained earlier with reference to FIG. 8.

First, the image acquisition section 162 acquires the image 120 stored as a frame image in the frame buffer 70a and the image 122 stored as a frame image in the frame buffer 70b (S301).

Then, the resizing section 164 resizes the image 120 to the resolution of the image 122 (S302).

Then, the image generation section 166 generates the image 126 that combines the image 122 with the resized image 120, and stores the image 126 into the image storage section 160 (S303).

Then, the image acquisition section 162 acquires the image 128 stored as a frame image in the frame buffer 70c and the image 130 stored as a frame image in the frame buffer 70d (S304).

Then, the resizing section 164 resizes the image 128 to the resolution of the image 130 (S305).

Then, the image generation section 166 generates the image 134 that combines the image 130 with the resized image 128, and stores the image 134 into the image storage section 160 (S306).

Then, the display control section 168 performs control to display, on the display section 38a of the HMD 12a, the image 126 stored in the image storage section 160 (S307).

The display control section 168 then performs control to display on the display device 18a the image 134 stored in the image storage section 160 (S308).

Then, the transmission section 170 transmits the image 134 stored in the image storage section 160 to the entertainment system 10b (S309). Here, for example, the transmission section 170 may encode the image 134 before transmitting it to the entertainment system 10b.

Control is then returned to the processing in S301. In this process example, the processing ranging from S301 to S309 is thus performed repeatedly at a predetermined frame rate.

Figure 14:
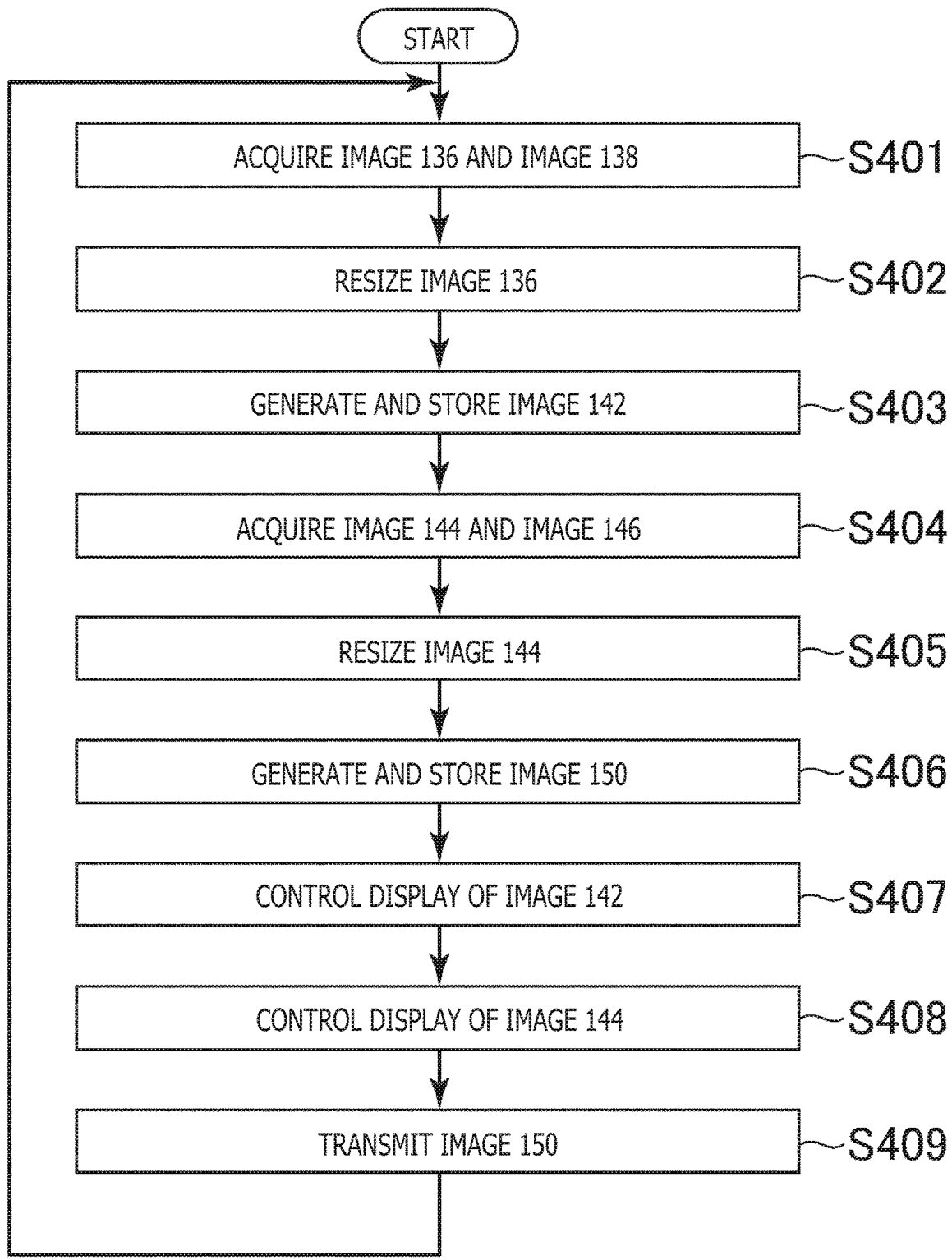
FIG. 14 is a flowchart depicting a typical flow of another process performed by the entertainment apparatus related to the embodiment of the present invention.

Explained next with reference to the flowchart of FIG. 14 is a typical flow of another process performed repeatedly at a predetermined frame rate by the entertainment apparatus 14 related to the present embodiment. The processing in this process example corresponds to the details explained earlier with reference to FIG. 9.

First, the image acquisition section 162 acquires the image 136 stored as a frame image in the frame buffer 70a and the image 138 stored as a frame image in the frame buffer 70b (S401).

Then, the resizing section 164 resizes the image 136 to the resolution of the image 138 (S402).

Then, the image generation section 166 generates the image 142 that combines the image 138 with the resized image 136, and stores the image 142 into the image storage section 160 (S403).

Then, the image acquisition section 162 acquires the image 144 stored as a frame image in the frame buffer 70c and the image 146 stored as a frame image in the frame buffer 70d (S404).

Then, the resizing section 164 resizes the image 144 to the resolution of the image 146 (S405).

Then, the image generation section 166 generates the image 150 that combines the image 146 with the resized image 144, and stores the image 150 into the image storage section 160 (S406).

Then, the display control section 168 performs control to display, on the display section 38a of the HMD 12a, the image 142 stored in the image storage section 160 (S407).

The display control section 168 then performs control to display on the display device 18a the image 144 stored as a frame image in the frame buffer 70c (S408).

Then, the transmission section 170 transmits the image 150 stored in the image storage section 160 to the entertainment system 10b (S409). Here, for example, the transmission section 170 may encode the image 150 before transmitting it to the entertainment system 10b.

Control is then returned to the processing in S401. In this process example, the processing ranging from S401 to S409 is thus performed repeatedly at a predetermined frame rate.

It is to be noted that the present invention when embodied is not limited to the above-described embodiment.

It is also to be noted that specific letter strings and numerical values in the foregoing description as well as in the accompanying drawings are only examples and are not limitative of the present invention.

The invention claimed is:

1. An image generation apparatus comprising:
a game image acquisition section configured to acquire a game image indicative of content to be displayed on a player video display device and an audience video display device, the game image representing at least play status of a game in which a virtual three-dimensional object placed in a virtual three-dimensional space is viewed from a point of view in the virtual three-dimensional space;
a player information image acquisition section configured to acquire a player information image indicative of content to be displayed on one or more of the player video display device and the audience video display device;
an audience information image acquisition section configured to acquire an audience information image indicative of content to be displayed on the audience video display device and not on the player video display device;
a player video display device delivery target two-dimensional image acquisition section configured to acquire a player video display device delivery target two-dimensional image indicating a two-dimensional object targeted for delivery to the player video display device, the delivery target two-dimensional image having a same resolution as that of an image to be delivered to the player video display device;
an audience video display device delivery target two-dimensional image acquisition section configured to acquire an audience video display device delivery target two-dimensional image indicating a two-dimensional object targeted for delivery to the audience video display device, the delivery target two-dimensional image having a same resolution as that of an image to be delivered to the audience video display device;

a game image resizing section configured to resize the game image to the resolution of the player video display device delivery target two-dimensional image so as to generate a player video display device resized game image, and to resize the game image to the resolution of the audience video display device delivery target two-dimensional image so as to generate an audience video display device resized game image; and a delivery image generation section configured to generate a player video display device image for display on the player video display device that combines the player video display device resized game image with the player video display device delivery target two-dimensional image and to generate an audience video display device image for display on the audience video display device that combines the audience video display device resized game image with the audience video display device delivery target two-dimensional image;

wherein the player video display device image includes the player information image content and not the audience information image content, and the audience video display device image includes the player information image content and the audience information image content; and wherein the player video display device image and the audience video display device image have different resolutions.

2. The image generation apparatus according to claim 1, further comprising:

a three-dimensional space image acquisition section configured to acquire a three-dimensional space image indicating the play status of the game;

a display target two-dimensional image acquisition section configured to acquire a display target two-dimensional image indicating a two-dimensional object targeted for display on the display device, the display target two-dimensional image having a same resolution as that of an image to be displayed on the display device;

a three-dimensional space image resizing section configured to resize the three-dimensional space image to the resolution of the display target two-dimensional image so as to generate a resized three-dimensional space image; and a game image generation section configured to generate the game image by combining the resized three-dimensional space image with the display target two-dimensional image.

3. The image generation apparatus according to claim 2, further comprising:

a first frame buffer configured to store the three-dimensional space image;

a second frame buffer configured to store the display target two-dimensional image; and a third frame buffer configured to store the delivery target two-dimensional image.

4. The image generation apparatus according to claim 1, further comprising:

a display target two-dimensional image acquisition section configured to acquire a display target two-dimensional image indicating a two-dimensional object targeted for display on the display device, the display target two-dimensional image having a same resolution as that of an image to be displayed on the display device, wherein the game image resizing section resizes the game image to the resolution of the delivery target two-dimensional image so as to generate a first resized game image, the game image resizing section resizes the game image to the resolution of the display target two-dimensional image so as to generate a second resized game image, the delivery image generation section generates an image that combines the first resized game image with the delivery target two-dimensional image, and a display image generation section that generates an image that combines the second resized game image with the display target two-dimensional image is further included.

5. The image generation apparatus according to claim 4, further comprising:

a first frame buffer configured to store the game image;

a second frame buffer configured to store the display target two-dimensional image; and a third frame buffer configured to store the delivery target two-dimensional image.

6. The image generation apparatus according to claim 1, wherein the two-dimensional object is a letter, a pictorial figure, or a symbol.

7. An image generation method comprising:

acquiring a game image indicative of content to be displayed on a player video display device and an audience video display device, the game image representing at least play status of a game in which a virtual three-dimensional object placed in a virtual three-dimensional space is viewed from a point of view in the virtual three-dimensional space;

acquiring a player information image indicative of content to be displayed on one or more of the player video display device and the audience video display device;

acquiring an audience information image indicative of content to be displayed on the audience video display device and not on the player video display device;

acquiring a player video display device delivery target two-dimensional image indicating a two-dimensional object targeted for delivery to the player video display device, the delivery target two-dimensional image having a same resolution as that of an image to be delivered to the player video display device;

acquiring an audience video display device delivery target two-dimensional image indicating a two-dimensional object targeted for delivery to the audience video display device, the delivery target two-dimensional image having a same resolution as that of an image to be delivered to the audience video display device;

resizing the game image to the resolution of the player video display device delivery target two-dimensional image so as to generate a player video display device resized game image, and resizing the game image to the resolution of the audience video display device delivery target two-dimensional image so as to generate an audience video display device resized game image; and generating a player video display device an-image for display on the player video display device that combines the player video display device resized game image with the player video display device delivery target two-dimensional image, and generating an audience video display device image for display on the audience video display device that combines the audience video display device resized game image with the audience video display device delivery target two-dimensional image;

wherein the player video display device image includes the player information image content and not the audience information image content, and the audience video display device image includes the player information image content and the audience information image content and wherein the player video display device image and the audience video display device image have different resolutions.

8. A non-transitory, computer readable storage medium containing a program, which when executed by a computer, causes the computer to conduct an image generating method by carrying out actions, comprising:

acquiring a game image indicative of content to be displayed on a player video display device and an audience video display device, the game image representing at least play status of a game in which a virtual three-dimensional object placed in a virtual three-dimensional space is viewed from a point of view in the virtual three-dimensional space;

acquiring a player information image indicative of content to be displayed on one or more of the player video display device and the audience video display device;

acquiring an audience information image indicative of content to be displayed on the audience video display device and not on the player video display device;

acquiring a player video display device delivery target two-dimensional image indicating a two-dimensional object targeted for delivery to the player video display device, the delivery target two-dimensional image having a same resolution as that of an image to be delivered to the player video display device;

acquiring an audience video display device delivery target two-dimensional image indicating a two-dimensional object targeted for delivery to the audience video display device, the delivery target two-dimensional image having a same resolution as that of an image to be delivered to the audience video display device;

resizing the game image to the resolution of the player video display device delivery target two-dimensional image so as to generate a player video display device resized game image, and resizing the game image to the resolution of the audience video display device delivery target two-dimensional image so as to generate an audience video display device resized game image; and generating a player video display device an-image for display on the player video display device that combines the player video display device resized game image with the player video display device delivery target two-dimensional image, and generating an audience video display device image for display on the audience video display device that combines the audience video display device resized game image with the audience video display device delivery target two-dimensional image;

wherein the player video display device image includes the player information image content and not the audience information image content, and the audience video display device image includes the player information image content and the audience information image content and wherein the player video display device image and the audience video display device image have different resolutions.

* * * * *

UNITED STATES PATENT AND TRADEMARK OFFICE
CERTIFICATE OF CORRECTION

PATENT NO. : 11,962,820 B2
APPLICATION NO. : 17/267238
DATED : April 16, 2024
INVENTOR(S) : Sachiyo Aoki et al.

It is certified that error appears in the above-identified patent and that said Letters Patent is hereby corrected as shown below:

In the Claims

In Claim 7, Column 20, Line 61, change "an-image" to --image--.

In Claim 8, Column 22, Line 14, change "an-image" to --image--.

Signed and Sealed this
Twenty-first Day of May, 2024

Katherine Kelly Vidal
*Director of the United States Patent and Trademark Office*